(12) United States Patent  
Aaron et al.

(10) Patent No.: US 7,543,068 B2  
(45) Date of Patent: Jun. 2, 2009

(54) FILTERING INFORMATION AT A DATA NETWORK BASED ON FILTER RULES ASSOCIATED WITH CONSUMER PROCESSING DEVICES

(75) Inventors: Jeffrey A. Aaron, Atlanta, GA (US); Jun-Gang Alin, Duluth, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 752 days.

(21) Appl. No.: 10/926,688

(22) Filed: Aug. 26, 2004

(65) Prior Publication Data

US 2006/0047634 A1 Mar. 2, 2006

(51) Int. Cl.
*G06F 15/16* (2006.01)

(52) U.S. Cl. ........................ 709/228; 709/203; 709/219; 709/246; 725/34

(58) Field of Classification Search ................. 709/203, 709/223, 217, 219, 246, 224, 228; 725/32, 725/34

See application file for complete search history.

(56) References Cited

U.S. PATENT DOCUMENTS

| | | | | |
|---|---|---|---|---|
| 6,049,821 | A * | 4/2000 | Theriault et al. | 709/203 |
| 6,128,655 | A * | 10/2000 | Fields et al. | 709/219 |
| 6,236,395 | B1 * | 5/2001 | Sezan et al. | 715/723 |
| 6,317,795 | B1 * | 11/2001 | Malkin et al. | 709/246 |
| 6,757,691 | B1 * | 6/2004 | Welsh et al. | 707/104.1 |
| 6,823,372 | B1 * | 11/2004 | Kreiner et al. | 709/218 |
| 7,096,486 | B1 * | 8/2006 | Ukai et al. | 725/58 |
| 7,249,196 | B1 * | 7/2007 | Peiffer et al. | 709/246 |
| 2001/0020242 | A1 * | 9/2001 | Gupta et al. | 707/501.1 |
| 2002/0016801 | A1 * | 2/2002 | Reiley et al. | 707/523 |
| 2003/0035002 | A1 * | 2/2003 | Moles | 345/760 |
| 2003/0131106 | A1 * | 7/2003 | Kasriel | 709/225 |
| 2003/0135555 | A1 * | 7/2003 | Birrel et al. | 709/206 |
| 2004/0045040 | A1 * | 3/2004 | Hayward | 725/135 |
| 2004/0049780 | A1 * | 3/2004 | Gee | 725/32 |
| 2004/0117388 | A1 * | 6/2004 | Inaba et al. | 707/100 |
| 2004/0237106 | A1 * | 11/2004 | Brule | 725/46 |
| 2005/0159942 | A1 * | 7/2005 | Singhal | 704/219 |
| 2005/0216460 | A1 * | 9/2005 | Yoon et al. | 707/6 |
| 2006/0004716 | A1 * | 1/2006 | Hurst-Hiller et al. | 707/3 |
| 2006/0259543 | A1 * | 11/2006 | Tindall | 709/203 |

* cited by examiner

*Primary Examiner*—Oanh Duong  
(74) *Attorney, Agent, or Firm*—Myers Bigel Sibley & Sajovec, P.A.

(57) ABSTRACT

Information that is being communicated from information sources, such as servers, through a data network to consumer processing devices is filtered by the data network. Filter rules are associated with the consumer processing devices. Information is received at the data network from at least one of the information sources that is addressed to one of the consumer processing devices. The information is filtered at the data network based on the filter rules associated with the addressed consumer processing device to generate filtered information. The filtered information is then communicated from the data network to the addressed consumer processing device.

18 Claims, 4 Drawing Sheets

FILTERING INFORMATION AT A DATA NETWORK BASED ON FILTER RULES ASSOCIATED WITH CONSUMER PROCESSING DEVICES

FIELD OF THE INVENTION

The present invention generally relates to the field of data networks, and more particularly to filtering information communicated from information sources to consumer devices through data networks.

BACKGROUND OF THE INVENTION

The Internet has become a worldwide packet switched network for communicating nearly all forms of information, including text, graphics, video, audio, and animations. The Internet includes a World Wide Web (WWW) of client-server based facilities on which web pages and files can reside on information sources, such as servers, and users can interface with the information sources via consumer processing devices configured for web browsing.

To obtain information (such as a HTML file) from a web site, a web browser first sends a request to an information server for that web site. The request can include an internet protocol (IP) address assigned to the consumer processing device and a uniform resource locator (URL) that identifies the information server on which the requested information resides. Upon receiving the request, the information server retrieves the requested information and sends it to the browser associated with the IP address. Upon receiving the information, the browser can display the information as a web page to a user. The information may contain user selectable links to other information at the information server, which can be selected to cause the browser to request corresponding information from the information server.

While technological improvements are allowing users to download more information in less time, enhancements to the information content of pages (such as real time audio and video) may increase the amount of information to be downloaded and, hence, may increase wait time. Much of the information content of a downloaded web page can be undesirable to a user. For example, it is now commonplace for web pages to include advertisements that include large information files, such as video, audio, and/or animations to capture a user's attention. Even web page content, which is not advertisements, may contain large portions that may not be pertinent or desirable to a particular user. Consequently, users sometimes await the download of significant amounts of undesired information in order to obtain desired information. Once downloaded, the resulting page that is displayed to a user can contain animations, video, and audio that may be superfluous, distracting, and/or offensive to the user. Associated delay and annoyance can be compounded as a user downloads further pages via the selectable links.

SUMMARY OF THE INVENTION

Some embodiments of the present invention provide methods of filtering information that is communicated from information sources through a data network to consumer processing devices. Filter rules are associated with the consumer processing devices. Information is received at the data network from at least one of the information sources, and is addressed or otherwise communicated to one of the consumer processing devices, and may for instance be fully or partially determined based on user preference input. The information is filtered at the data network based on the filter rules associated with the addressed consumer processing device to generate filtered information. The filtered information is communicated from the data network to the addressed consumer processing device. The information sources may be, for example, information servers that are communicatively connected to the data network.

Accordingly, information from information sources may be filtered by the data network before it is communicated to consumer processing devices. Such filtering by the data network may lower the amount of information that is communicated to the consumer processing devices (i.e., lower communication bandwidth utilization) and may avoid undesirable information from being communicated to users.

In some further embodiments of the present invention, a user may define the filter rules for what information is allowable for communication to a consumer processing device that is associated with the user. In addition or instead of such manual filter rule definition, the filter rules may be generated by estimating in whole or in part a user's preferences of information content, such as by monitoring metrics associated with information that is communicated to the user. The monitored metrics can include what information content was selected by the user for downloading, what information content was not selected by the user for downloading, and/or how much time information content may be viewed by the user.

In some other further embodiments of the present invention, the data network filters the information by classifying portions of the information among a plurality of information types, and by selectively modifying the information to generate at least a portion the filtered information based on the classification of the portions and the filter rules associated with the addressed consumer processing device. The information may be classified as containing at least text, graphics, video, audio, animation, and/or a combination thereof. The information may be modified to generate at least a portion of the filtered information by replacing a classified portion of the information with a representative marker. The marker may be indicative of whether the replaced portion of the information contains at least text, graphics, video, audio, animation, and/or a combination thereof, and/or it may be indicative of the size and/or play time of the replaced portion of the information.

When portion(s) of the information are replaced with a marker, the replaced portion(s) may be stored at the data network. The marker may include a user selectable link to the stored portion(s) at the data network. Accordingly, a user may select the link to cause the data network to download the selected portion from the data network to the user.

The information may be filtered by the data network by identifying a repetition of content and/or a randomness of content of the information, and filtering the information based on the identified repetition and/or randomness of content of the information. The data network may filter the information based on at least one keyword that is defined by the filter rules that are associated with the addressed consumer processing device.

Some other embodiments of the present invention provide data networks that include an information filter that is configured to associate filter rules with consumer processing devices, configured to receive information from at least one information server that is addressed to at least one of the consumer processing devices, configured to filter the information based on the filter rules associated with the addressed consumer processing device to generate filtered information, and configured to communicate the filtered information to the addressed consumer processing device.

Some other embodiments of the present invention provide a computer program product for filtering information communicated from information sources through a data network to consumer processing devices. The computer program product includes computer program code embodied in a computer-readable storage medium. The computer program code is configured to associate filter rules with the consumer processing devices, configured to receive information from at least one of the information sources that is addressed to one of the consumer processing devices, configured to filter the information at the data network based on the filter rules associated with the addressed consumer processing device to generate filtered information, and configured to communicate the filtered information from the data network. Some other embodiments may provide some or all of the filtering functions at the information source, or at the consumer processing device, in addition to or instead of providing some or all of the filtering functions in/at the network.

Other methods, data networks, and/or computer program products according to embodiments will be or become apparent to one with skill in the art upon review of the following drawings and detailed description. It is intended that all such additional methods, data networks, and/or computer program products be included within this description, be within the scope of the present invention, and be protected by the accompanying claims.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention may be embodied as methods and/or data networks. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, data networks, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
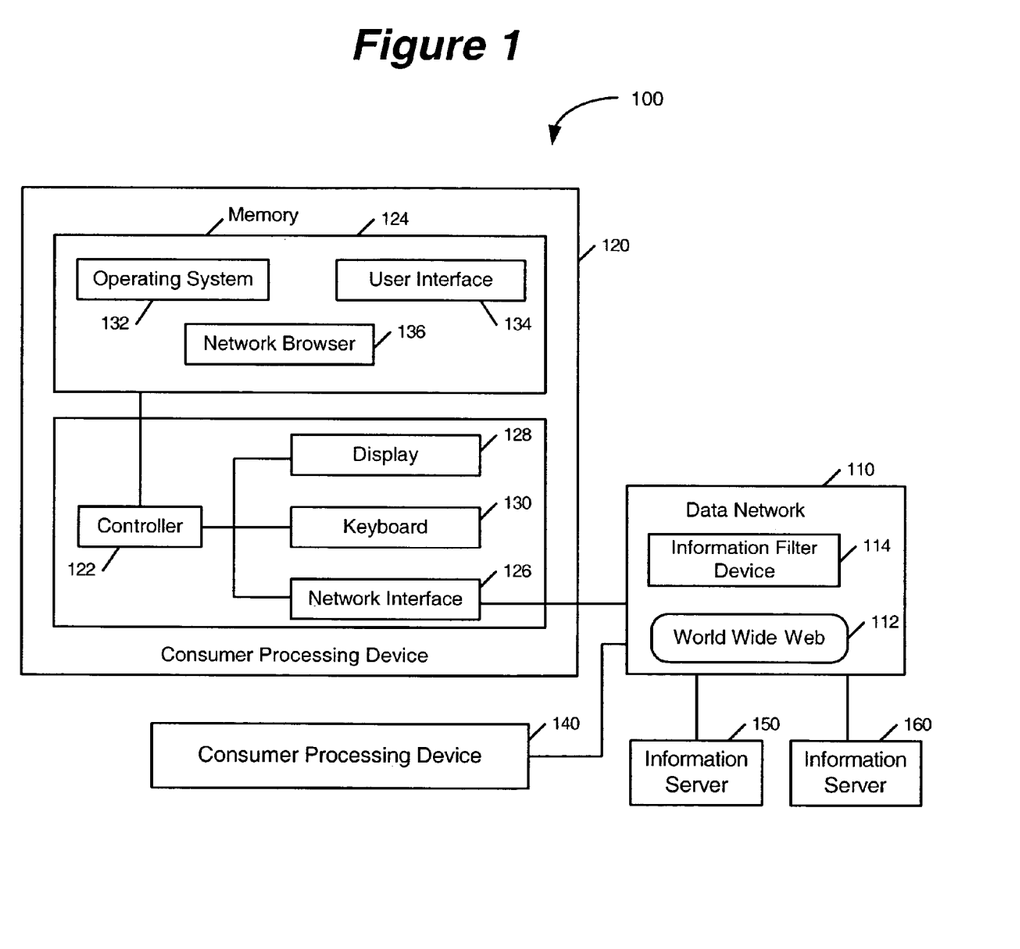
FIG. 1 is a block diagram of a communication system and methods that filter information communicated between information sources and consumer processing devices according to some embodiments of the present invention.

FIG. 1 is a block diagram of a communication system 100 and methods that includes a data network 110, a plurality of consumer processing devices 120 and 140, and a plurality of information sources 150 and 160. The information sources 150 and/or 160 may be, for example, information servers (e.g., application data servers) that are communicatively connected to the data network 110. The data network 110 can route information between the consumer processing devices 120 and 140 and the information sources 150 and 160, and may route the information to various other networks, devices, and/or information sources. The data network 110 may, for example, include a portion of the web 112 of data networks that forms the World Wide Web, and/or the Internet and/or similar information & communication networks.

As used herein, the term "consumer processing device" includes any device that is configured to receive information from an information source through a data network, and includes, but is not limited to, a computer or a mobile terminal, such as personal data assistant and/or cellular telephone, with a network interface. The network interface may be, for example, a cable modem, a digital subscriber line modem, a public switched telephone network modem, and/or a wireless network interface, such as a wireless local area network interface and/or a wireless wide area network interface. A consumer processing device that communicates through a wireless interface with the data network 110 may be configured to communicate via a wireless protocol such as, for example, a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, another RF communication protocol, the Internet Protocol (EP) suite, and/or an optical communication protocol. As used herein, "consumer" refers to any end-user, without limitation as to whether they are a consumer of goods.

As illustrated in FIG. 1, the exemplary consumer processing device 120 can include a controller 122, a memory 124, a network interface 126, a display 128, and a keyboard 130 and/or other user interface. The memory 124 is representative of the overall hierarchy of memory devices containing an operating system 132, a user interface 134, and a network browser 136 (e.g., Internet browser) that provide operations that can be executed to configure the controller 122 to provide the functionality of the consumer processing device 120. The network browser 136 configures the controller 122 to interface with the information sources 150 and 160 via the data network 110, and to display pages (i.e., on the display 128) based on information that is downloaded therefrom. The displayed pages can include user selectable links which a user can select via, for example, the keyboard 130, to download information. The consumer processing device 140 may be configured the same as the consumer processing device 120.

According to some embodiments of the present invention, the data network 110 includes an information filter 114 that filters information communicated between the information sources 150 and 160 and the consumer processing devices 120 and 140. The information filter 114 is configured to associate rules with the consumer processing devices 120 and 140, and to receive information from the information sources 150 and 160 that is addressed to one or both of the consumer processing devices 120 and 140 via the web 112. The information may, for example, have been requested by the consumer processing devices 120 and 140 (i.e., a web page addressed via the network browser 136) and/or it may be pushed by the information sources 150 and 160 to the consumer processing devices 120 and 140 without a prior request. The information filter 114 can also filter the information based on the filter rules associated with the addressed consumer processing device 120 and/or 140 to generate filtered information, and to communicate the filtered information through the data network 110 to the addressed consumer processing devices 120 and/or 140.

Accordingly, information from the information sources 150 and 160 can be filtered by the data network 110 before communication to the consumer processing devices 120 and/or 140. Such filtering by the data network 110 may lower the amount of information that is communicated to the consumer processing devices 120 and 140 (i.e., lower communication bandwidth utilization) and may avoid undesirable and/or superfluous information from being communicated to a user.

Although FIG. 1 illustrates an exemplary communication system 100, it will be understood that the present invention is not limited to such a configuration, but is intended instead to encompass any configuration capable of carrying out the operations described herein. For example, although only two consumer processing devices 120 and 140 and two information sources 150 and 160 have been shown for illustration purposes, it will be understood that the data network 110 would generally route information among thousands of consumer processing devices and numerous information sources.

Figure 2:
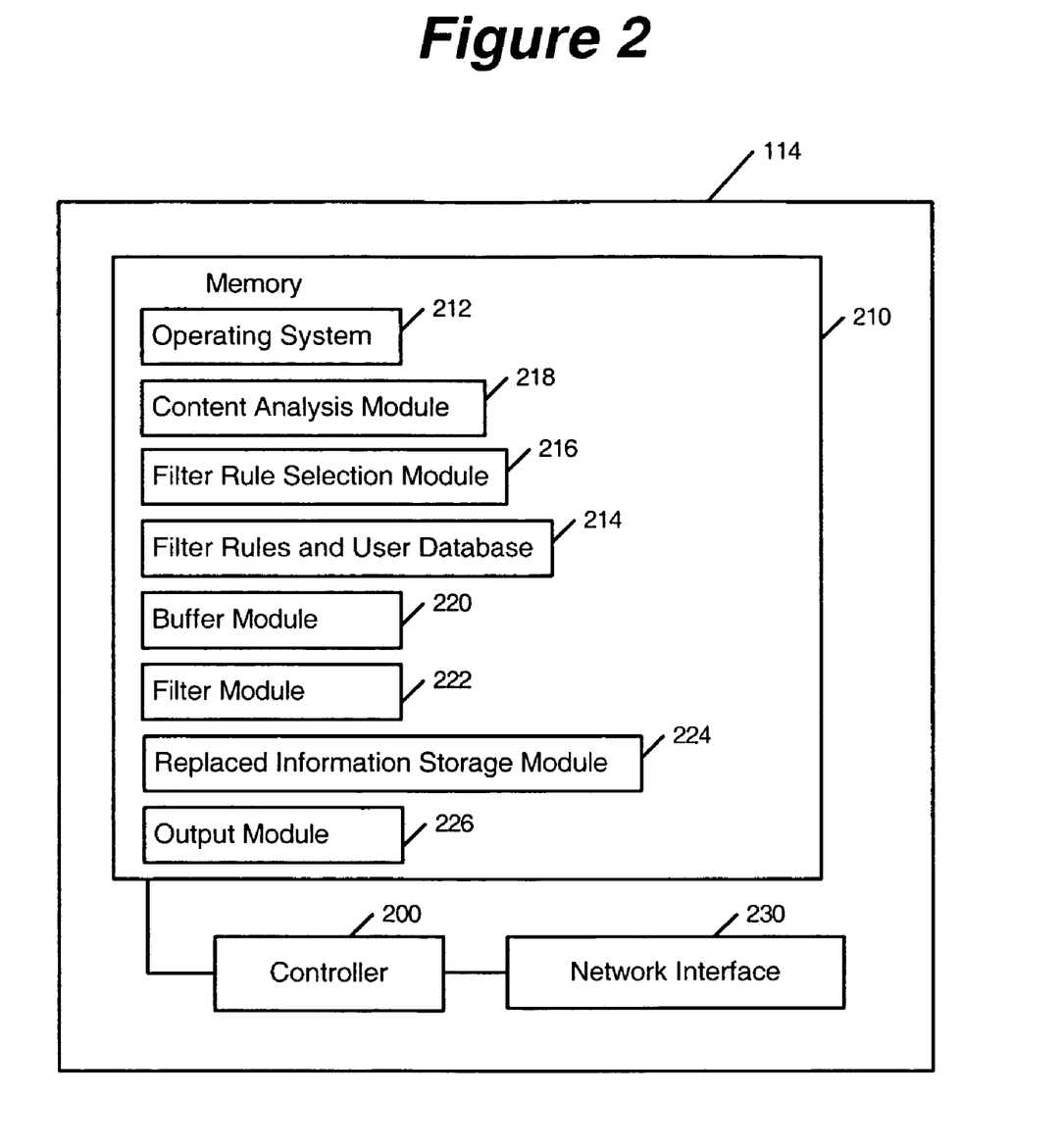
FIG. 2 is a block diagram of an information filter and methods according to some embodiments of the present invention.

Referring now to FIG. 2, the information filter 114 may include a controller 200, a memory 210, and a network interface 230 in accordance with various embodiments of the present invention. The memory 210 is representative of the overall hierarchy of memory devices and may contain an operating system 212, a database 214 of filter rules and associated user information, a filter rule selection module 216, a content analysis module 218, an information buffer module 220, a filter module 222, a replaced information storage module 224, and an output module 226, which provide operations that can be executed to configure the controller 200 to provide the functionality of the information filter 114. The network interface 230 is configured to monitor, and may intercept, information that is being communicated from the information sources 150 and 160 to the consumer processing devices 120 and 140. Although only a single controller 200, memory 210, and network interface 230 have been shown for purposes of illustration, it will be understood that embodiments of the present invention encompass any configuration of an information filter capable of carrying out the operations described herein.

The database 214 associates one or more rules with users or consumer processing devices. The users may be identified by an address assigned to the network interface 126 of a consumer processing device. The address may, for example, uniquely identify a network modem (e.g., cable modem and/or digital subscriber line modem), wireless router (e.g., WLAN router), Network Interface Card (NIC) in a PC or laptop or other computing device, and/or cellular equipment that serve as the network interface 126. Users may need to subscribe on a fee basis to be added to the database 214 and obtain the filter services of the information filter 114.

Users and/or an operators associated with the information filter 114 may define the rules in the database 214 that are used to filter information communicated to their consumer processing device(s). Such rule definition may be accomplished on-line by logging into a website that is associated with the data network 110. The rules may define information content that is to be filtered, including, but not limited to: keywords in text; types of information content such as text, graphics, video, audio, animation, and/or a combination thereof; and/or size (e.g., kilobytes or Megabytes) or length of play (e.g., play time of audio, video, and/or animations) associated with portions of information. The rules may be configured to estimate a user's preferences of information content. For example, the rules can cause the information filter 114 to monitor metrics associated with information that is communicated to a user, and to adaptively filter information addressed to the user based on the monitored metrics, as will be described in further detail below.

The buffer module 220 may be used to temporarily buffer information that is received by the network interface 230, and which may be addressed to a consumer processing device that may be identified in the database 214. The filter rule selection module 216 can query the database 214 to select what rules, if any, are to be applied to the buffered information. The content analysis module 218 can analyze the buffered information to generate analysis data, which can be used by the filter module 222 to filter the buffered information and generate filtered information. The filtered information can then be communicated to the addressed consumer processing device by the output module 226.

The selected rules can define that information is to be filtered based on the content of the information in total, or portions thereof. For example, based on a selected rule, the content analysis module 218 can classify portions of the information based on their content type, including, but not limited to, text, graphics, video, audio, animation, and/or a combination thereof, and can generate analysis data based thereon. The information may be classified by inserting labels into the information that identify the type and location of portions of the information. For example, information that includes a text portion, an audio portion, and a graphic portion may have each portion separately labeled so as to identify their content type and location. In further examples, "portions" can be sub-portions, or sub-divisions, of larger "classified" portions, where the sub-portions may also be labeled so that they can be processed/filtered separately. For instance, text portions may be sub-divided into page, paragraph, and sentence portions, etc. Video portions may be sub-divided into scene and frame portions, etc. Audio portions may be sub-divided into phrase, sentence, and paragraph portions, etc. Graphic portions may be sub-divided into smaller component graphic portions. The capability to separately process & filter these smaller portions may provide flexibility, precision, and useful filtering ability for the user. Such classification may, for example, be based on XML tags or other tags associated with the information.

The content analysis module 218 may search the information for one or more keywords based on a selected rule, and/or may determine the size and/or length of play of the information and/or classified portions thereof, and may generate analysis data based thereon. The content analysis module 218 may search the information to measure an amount of repetition and/or randomness of content of the information and generate analysis data based thereon. The filter module 222 can then filter the buffered information based on the analysis data and based on the selected rules to generate filtered information, which can be communicated to the addressed consumer processing device via the output module 226 and network interface 230.

The filter module 222 may filter portions of the buffered information by, for example, modifying, removing, or replacing the portions with a marker to generate the filtered information. For example, when the content analysis module 218 determines that the information contains a keyword or threshold number of keywords, a threshold amount of repetition, and/or a threshold amount of randomness, the filter module 222 may replace the identified portion with a marker that can be indicative of what was removed. A high degree of content randomness in a portion of information can indicate that it is encrypted, and, thereby, that it may contain an undesired executable program such as a virus or a program that covertly gathers information about a user (e.g., spyware). Accordingly, the information may be filtered to modify, remove, and/or replace the identified portion with a marker.

When portions of information are replaced with a marker, the replaced information can be retained at the information filter 114 by the storage module 224. The marker can then include a user selectable link that is logically associated with (i.e., addressed to) the information portion retained at the information filter 114. When the filtered information containing the marker is displayed to a user, the user may select the link to cause the replaced portion of information to be downloaded from the information filter 114. In particular, a user may select the link to cause the network browser 136 to fetch the information from the information filter 114. By at least temporarily retaining the removed information at the information filter 114, it may be downloaded more quickly to a user, and be more responsive to a user's request, than may otherwise be provided if it were to be fetched from an information source directly. Moreover, retaining the replaced information at the information filter 114 may ensure that it can be later retrieved by a user, for at least a limited time, even though the information may have been deleted, modified, moved, or otherwise rendered irretrievable from the information source.

The content analysis module 218 may evaluate words within textual portions of information to determine what language they may represent and/or to determine a level of complexity, such as technical complexity, and to generate the analysis data used by the filter module 222. For information portions that contain numbers, the content analysis module 218 may evaluate the numbers to identify predefined numbers or patterns of numbers, to identify number formats, such as currency notations, scientific notations, and/or unit notations (e.g., metric), and/or to identify a proportional amount of numbers relative to words. For audio portions of the information, it may detect keywords, phrases, sounds, and/or language and generate the analysis data based thereon. If multiple languages are present, it may determine relative amounts of each language. It may also measure the size of portions of the information and/or may measure an amount of time that audio, video, and/or animations may take to play, and generate the analysis data based thereon.

The content analysis module 218 may also be used to estimate a user's preferences for content in downloaded information. For example, the content analysis module 218 may monitor metrics associated with information that is communicated to a user. The monitored metrics can be indicative of what information content was selected by a user for further downloading, indicative of what information content was not selected by a user for further downloading, and/or indicative of how much time information content may have been viewed by a user, and in what context or contexts. Context can include the web sites being accessed, the depth of web site access, associated keywords matched in the content portions, the classification or classifications and/or mixture of classifications of the information portions, time of day, the information service or services being used, and the degree to which filtered information of a particular type has been retrieved by the user in the past or recent past. For example, if a user closes animations within a web page, or doesn't select video or audio that is available from a web page for playing, the content analysis module 218 can determine that that user prefers to avoid such content in downloaded information. The filter module 222 may then remove such content, or replace it with a marker, to generate filtered information that is downloaded to the user. In another example, a user's selections of links in a web page may be monitored, and analysis data may be generated based on characteristics associated with the selected links, such as the address of the information source and/or content of the selected web page. Information from certain information sources, certain web pages, and/or having certain content may then be filtered differently (including being downloaded unchanged) compared to information from other sources, pages, or having other content. The analysis data generated by the content analysis module 218 can thereby be used to estimate at least part of a user's preferences for content in downloaded information.

The content analysis module 218 may include a plurality of modules that can analyze the information in parallel of each other. The filter module 222 may then combine the analysis data from each of the modules, such as by a weighted summation thereof, compare the combined data to a threshold, and make a decision relative to filtering of the information based on the comparison. For example, one content analysis module may search the information for keywords while another one of the content analysis modules is classifying portions of the information. Such parallel processing of the information may reduce delay in communication of filtered information to a user.

For purposes of illustration only, exemplary rules that may be sequentially applied to filter information based on the analysis data from the content analysis module 218 are shown below:

1. Delete entire text if text size exceeds 2000 words and the text is classified as an on-line magazine article;
2. Replace all repeated words with "&R{first two letters of repeated words}&R";
3. Delete entire text if text size exceeds 1500 words and the text is classified as an on-line new article or web page;
4. Delete entire text if text size is less than 25 words;
5. Retain entire text if the represented language is English or French, otherwise delete entire text;
6. Delete entire text if grade-level (complexity) exceeds 12 or grade-level is less than 3;
7. Retain entire text if contains keyword "stock market boom" irrespective of subsequent rules (ignore subsequent rules if true);
8. Delete entire text if contains keyword "politics" or "soccer";
9. Replace paragraph with "&C9&" if paragraph grade-level exceeds 9;
10. Replace paragraph with "&N20&" if analysis data for paragraph exceeds 20; and
11. Retain entire text if analysis data of preferred keywords present exceeds 4 and analysis data for randomness search is less than 35 on a scale of 0-100, otherwise delete entire text.

A user may be allowed to selectively override and/or modify the filter rules, and such changes may expire after a user defined time period.

Figure 3:
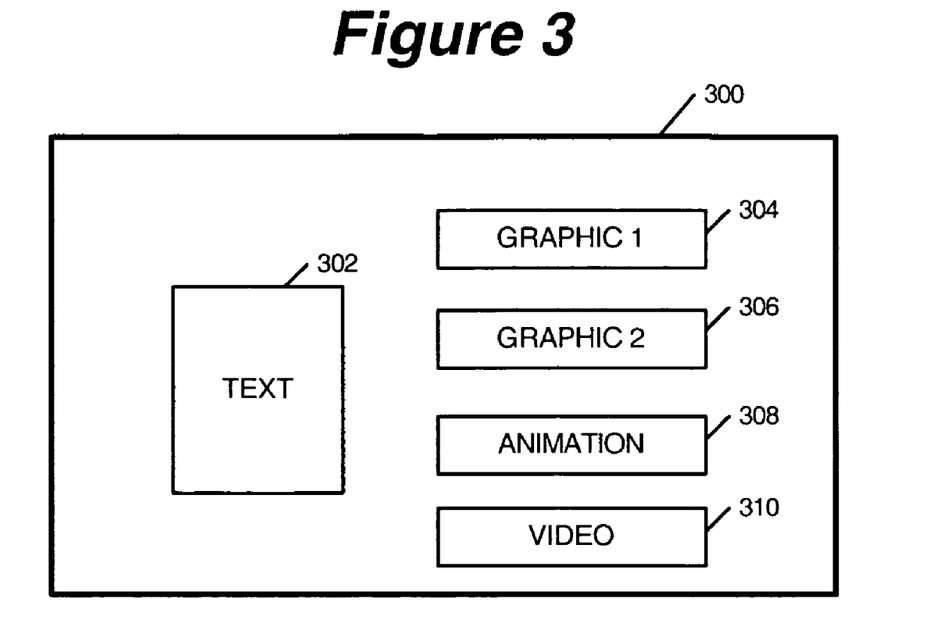
FIG. 3 is a block diagram of a web page displayed based on unfiltered information.

Reference is now made to FIG. 3 which illustrates a web page 300 that may be displayed on the consumer processing device 120 based on information from the information source 150, and which has not been modified by the information filter 114. The web page 300 is formed by downloaded information that generate the illustrated "TEXT" 302, "GRAPHIC 1" 304, "GRAPHIC 2" 306, "ANIMATION" 308, and "VIDEO" 310 portions of the web page 300. Although not shown, the web page 300 also has embedded audio. The illustrated web page 300 may correspond to information that is downloaded to a user who has not registered for filtering services.

Figure 4:
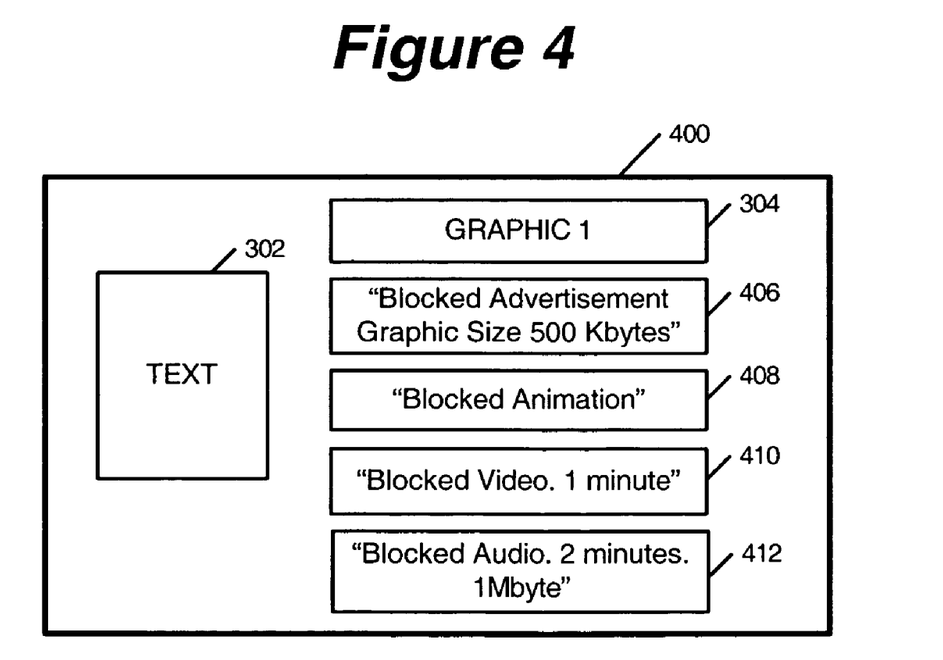
FIG. 4 is a block diagram of a web page displayed based on filtered information according to some embodiments of the present invention.

Referring now to FIG. 4, a web page 400 is illustrated that may be based on the same information from the information source as was communicated for FIG. 3, but which has been filtered by the information filter 114 and then downloaded to generate the web page 400. The portions of the source information that corresponds to "TEXT" 300 and "GRAPHIC 1" 302 were not modified. However, the portion of the source information that corresponds to "GRAPHIC 2" 306, "ANIMATION" 308, and "VIDEO" 310 were modified by replacing those portions (e.g., replacing a corresponding Java script and/or data) with the corresponding markers 406, 408, and 410 shown in FIG. 4. Moreover, the embedded audio portion of the information has been replaced with the marker 412.

As shown in FIG. 4, the marker 406 includes an indication that an advertisement graphic was blocked, and provides an indication of the size of the blocked graphic (i.e., 500 KBytes). Similarly, marker 408 provides an indication that an animation was blocked, marker 410 provides an indication that video was blocked and an indication of the expected play time of the video (i.e., 1 minute), and marker 412 provides an indication that audio was blocked and an indication of the expected play time of the audio and size of the audio portion (i.e., 2 minutes and 1 MByte). One or more of the markers 406, 408, 410, and 412 may include user selectable link(s) to the portions of the information that were replaced ("blocked") by the information filter 114. A user may select the link(s) to cause the information filter 114 to download the corresponding portion(s) of the replaced information, which may be retained at the information filter 114. For example, when a user selects marker 412, the network browser 136 may communicate an address or other associated identifier, sufficiently unique to refer specifically to the replaced information, from the marker 412 to the information filter 114 via the data network 110. The information filter 114 may then use the communicated address or identifier to retrieve the information portion from its local memory and download it to the network browser 136.

Figure 5:
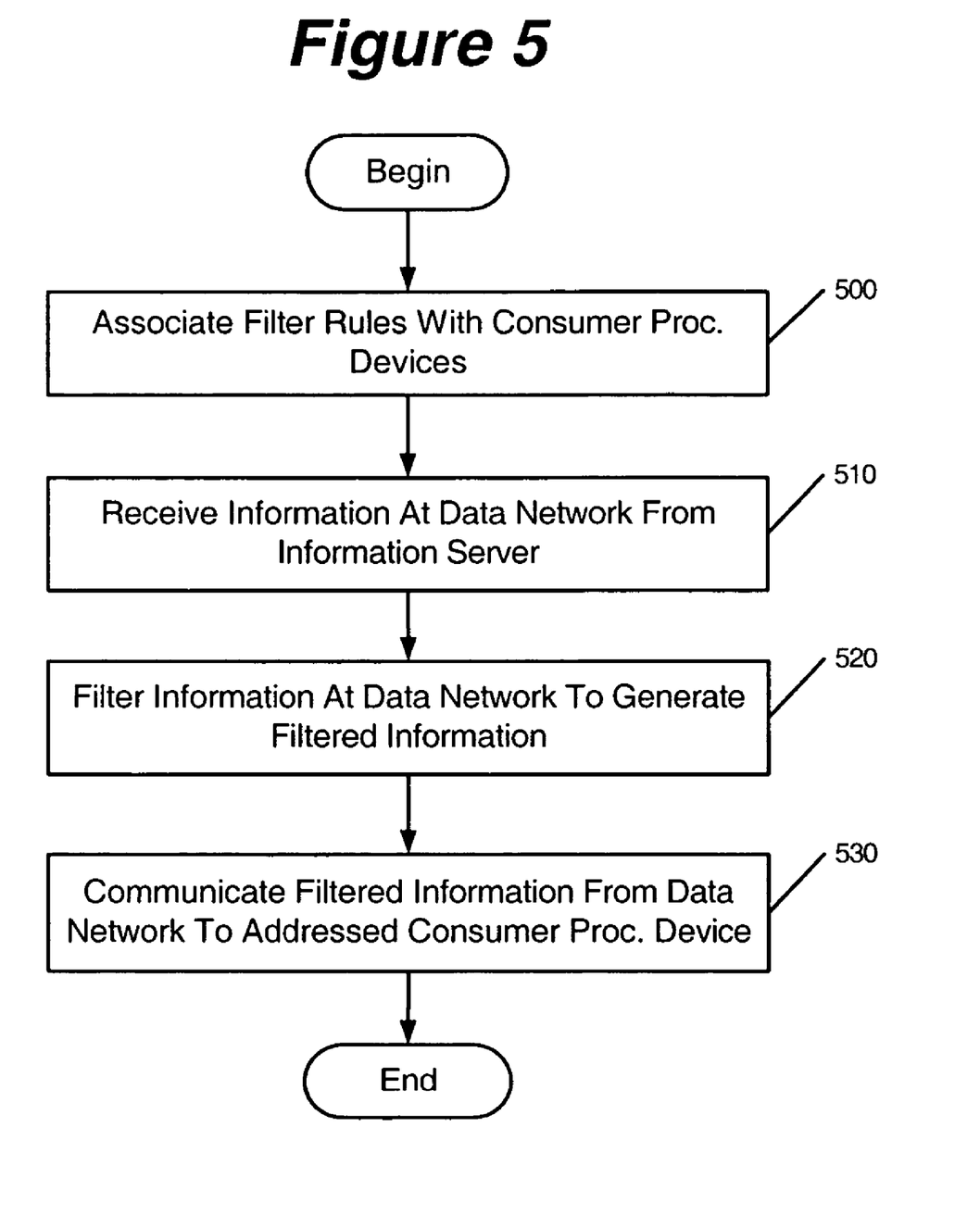
FIG. 5 is a flow chart illustrating operations for filtering information, at a data network, that is communicated from information sources to consumer processing devices according to some embodiments of the present invention.

Referring now to FIG. 5, a flow chart is shown that illustrates operations for filtering information communicated from information sources through a data network to consumer processing devices according to some embodiments of the present invention. The operations may be carried out by the exemplary information filter 114 illustrated in FIG. 1. At Block 500, filter rules are associated with the consumer processing devices. At Block 510, information is received at the data network from at least one of the information sources that is addressed to one of the consumer processing devices. At Block 520, the information is filtered at the data network based on the filter rules associated with the addressed consumer processing device to generate filtered information. At Block 530, the filtered information is communicated from the data network to the addressed consumer processing device.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of filtering information communicated from information sources through a data network to consumer processing devices, the method comprising:

associating filter rules with the consumer processing devices;

receiving information at the data network from at least one of the information sources that is addressed to one of the consumer processing devices;

filtering the information at an information filter device of the data network based on the filter rules associated with the addressed consumer processing device to generate filtered information by replacing a portion of the information with a user selectable link to generate at least a portion of the filtered information, storing the replaced portion of the information at the data network, and associating the user selectable link with the stored portion of the information, wherein the user selectable link indicates size and/or play time of the replaced portion of the information;

communicating the filtered information including the user selectable link from the data network to the addressed consumer processing device;

displaying, at the addressed consumer processing device, the size and/or the play time of the replaced portion of the information to a user; and in response to receiving a user selection of the user selectable link from the addressed consumer processing device, communicating the stored replaced portion of the information from the data network to the addressed consumer processing device, wherein the filter rules cause the information filter device to monitor metrics including identity of a website being access and depth of access into the website by the user, and said filtering the information is based on the monitored metrics.

2. The method of claim 1, wherein associating filter rules with the consumer processing devices comprises receiving at the data network at least one rule defined by a user for information that is allowable for communication to a consumer processing device that is associated with the user.

3. The method of claim 1, wherein associating filter rules with the consumer processing devices comprises estimating a user's preference of content of information that is communicated to one of the consumer processing devices that is associated with the user.

4. The method of claim 1, wherein filtering the information at the data network comprises:

classifying portions of the information among a plurality of information types; and selectively modifying the information to generate the filtered information based on the classified types of the portions of the information and the filter rules associated with the addressed consumer processing device.

5. The method of claim 4, wherein classifying portions of the information among a plurality of information types comprises classifying portions of the information as containing at least text, graphics, video, audio, animation, and/or a combination thereof.

6. The method of claim 1, wherein the user selectable link indicates whether the replaced portion of the information contains text, graphics, video, animation, and/or audio.

7. The method of claim 1, wherein the user selectable link indicates size and not play time of the replaced portion of the information.

8. The method of claim 1, wherein filtering the information at the data network comprises filtering the information based on at least one keyword defined by the filter rules associated with the addressed consumer processing device to generate the filtered information.

9. The method of claim 1, wherein filtering the information at the data network comprises:

identifying repetition of content of the information; and filtering the information based on the identified repetition of content of the information to generate the filtered information.

10. The method of claim 1, wherein filtering the information at the data network comprises:

identifying randomness of content of the information; and filtering the information based on the identified randomness of content of the information to generate the filtered information.

11. A data network comprising:

a memory;

an information filter device that is:

configured to associate filter rules with consumer processing devices, configured to receive information from at least one information source that is addressed to at least one of the consumer processing devices, configured to filter the information based on the filter rules associated with the addressed consumer processing device to generate filtered information by replacing a portion of the information with a user selectable link to generate at least a portion of the filtered information, by storing the replaced portion of the information in the memory, and by associating the user selectable link with the stored portion of the information, wherein the user selectable link indicates size and/or play time of the replaced portion of the information, and configured to communicate the filtered information including the user selectable link to the addressed consumer processing device and, in response to receiving a user selection of the user selectable link from the addressed consumer processing device, to communicate the replaced portion of the information from the memory to the addressed consumer processing device, wherein the addressed consumer processing device displays the size and/or the play time of the replaced portion of the information to a user, wherein the filter rules cause the information filter device to monitor metrics including identity of a website being access and depth of access into the website by the user, and wherein said filter the information is based on the monitored metrics.

12. The data network of claim 11, wherein the information filter is configured to classify portions of the information among a plurality of information types, and configured to selectively modify the information to generate the filtered information based on the classified types of the portions of the information and the filter rules associated with the addressed consumer processing device.

13. The data network of claim 11, wherein the user selectable link indicates size and play time of the replaced of the information.

14. The data network of claim 11, wherein the user selectable link indicates audio and/or video play time of the replaced portion of the information.

15. A computer program product for filtering information communicated from information sources through a data network to consumer processing devices, the computer program product comprising program code embodied in a computer-readable electronic memory, the computer program code comprising:

computer program code that when executed by a processor is configured to associate filter rules with the consumer processing devices;

computer program code that when executed by a processor is configured to receive information at the data network from at least one of the information sources that is addressed to one of the consumer processing devices;

computer program code that when executed by a processor is configured to selectively replace a portion of the information with a user selectable link based on the filter rules associated with the addressed consumer processing device to generate filtered information, wherein the user selectable link indicates size and/or play time of the replaced portion of the information;

computer program code that when executed by a processor is configured to store the replaced portion of the information at the data network;

computer program code that when executed by a processor is configured to associate the user selectable link with the stored portion of the information at the data network; and computer program code that when executed by a processor is configured to communicate the filtered information including the user selectable link from the data network to the addressed consumer processing device and, in response to receiving a user selection of the user selectable link from the addressed consumer processing device, to communicate the stored replaced portion of the information from the data network to the addressed consumer processing device, wherein the addressed consumer processing device displays the size and/or the play time of the replaced portion of the information to a user, wherein the filter rules cause the information filter device to monitor metrics including identity of a website being access and depth of access into the website by the user, and said filter the information is based on the monitored metrics.

16. The method of claim 1, wherein the user selectable link indicates audio and/or video play time of the replaced portion of the information.

17. The computer program product of claim 15, wherein the user selectable link indicates size and not play time of the replaced portion of the information.

18. The computer program product of claim 15, wherein the user selectable link indicates audio and/or video play time of the replaced portion of the information.

* * * * *

UNITED STATES PATENT AND TRADEMARK OFFICE
CERTIFICATE OF CORRECTION

| | | |
|---|---|---|
| PATENT NO. | : 7,543,068 B2 | Page 1 of 1 |
| APPLICATION NO. | : 10/926688 | |
| DATED | : June 2, 2009 | |
| INVENTOR(S) | : Aaron et al. | |

It is certified that error appears in the above-identified patent and that said Letters Patent is hereby corrected as shown below:

In the Claims:

Column 12, Claim 13, Line 45: Please correct "size and play time of the replaced of the"
to read -- size and not play time of the replaced portion of the --

Signed and Sealed this
Fifth Day of June, 2012

David J. Kappos
*Director of the United States Patent and Trademark Office*